Jan. 12, 1943.      A. F. GROLL      2,307,777
MEASURING DEVICE
Filed Aug. 2, 1940      2 Sheets-Sheet 1

INVENTOR.
ALVIN F. GROLL
BY Fay, Golrick, Williams + Fay
attorneys

Jan. 12, 1943.  A. F. GROLL  2,307,777
MEASURING DEVICE
Filed Aug. 2, 1940  2 Sheets-Sheet 2

INVENTOR.
ALVIN F. GROLL

Patented Jan. 12, 1943

2,307,777

UNITED STATES PATENT OFFICE 2,307,777

MEASURING DEVICE

Alvin F. Groll, Toledo, Ohio, assignor to E. W. Bliss Company, Brooklyn, N. Y., a corporation of Delaware Application August 2, 1940, Serial No. 349,753

7 Claims. (Cl. 33—141)

This invention relates to the feeding of sheets of steel or the like to an operating mechanism and particularly to a device by which the length of sheet fed is controlled and measured.

Sheet feeding devices should be as accurate as it is possible to make them in order that the length of sheet fed may be closely controlled. This is especially true where large numbers of sheets are fed and where it is desired to keep the amount of scrap down to a minimum. Furthermore, in feeding sheets, as steel, to dies, it is necessary that the length of stock fed be maintained within close limits to a predetermined figure in order that the drawing or forming operation may be of uniform accuracy in the case of each part made. Devices of the nature indicated above are normally used in feeding strip stock of varying widths and lengths to a forming machine, such as a drawing press. In many cases the strip or sheet is fed from a coil and a predetermined length of the coil is fed to the machine for each cycle of operation.

Devices of this character have heretofore been built to directly operate an indicating member through motion obtained from the traveling sheet. Among other disadvantages with such devices the surface characteristics of the sheet and any roller engaging the same occasioned some slippage with a consequent variation in movement transmitted from the moving sheet to operate the indicator.

The general object of the present invention has been to provide an indicating device which is driven by a power means independently of the moving sheet. In the present invention the travel of the sheet is employed to gauge the amount the indicator may be moved by its independent actuating means. In other words, the sheet movement is employed as a control rather than a driving force.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

Figure 1:
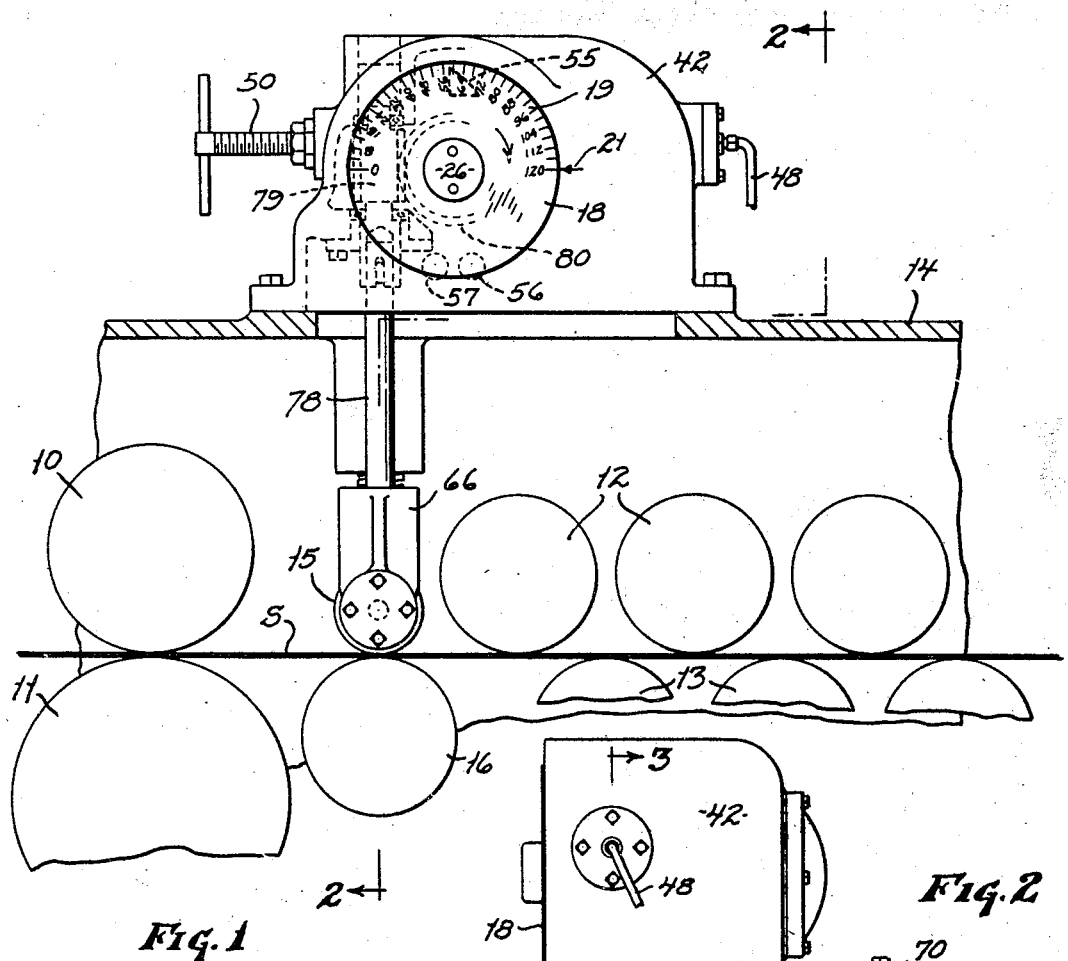
Fig. 1 is a schematic view of my improved indicator device mounted in connection with sheet feeding rolls.
Figure 2:
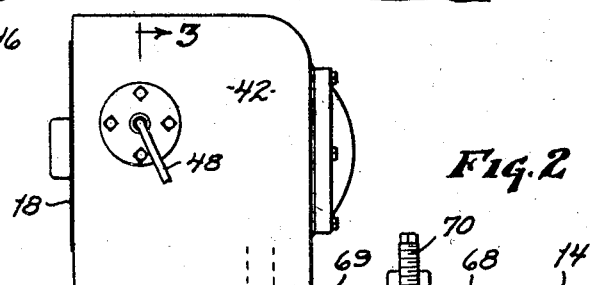
Fig. 2 is a section through Fig. 1, as indicated by the lines 2—2 thereon.

Referring now to Fig. 1, the invention is used with a conventional feeding mechanism employing a pair of pinch feeding rolls 10 and 11 and a series of straightening rolls 12 and 13. A roll 15 forming an operative part of the indicating device as hereafter described, is resiliently urged against a backing roll 16.

The length of stock fed during each operative cycle of the device is registered and controlled by an indicator member 18 including a graduated dial 19. This dial, as shown in Fig. 1, is calibrated in inches and by registration of the number of inches desired to be fed, with a zero point, indicated by an arrow 21, there is maintained an accurate reading of the sheet length. The indicator member is rotatably mounted on a sleeve 22, which sleeve is provided with a pinion gear 24. The sleeve is journalled in ball bearings 25 and is capped at 26 to thereby maintain the bearings and the indicator member against a shoulder of the pinion 24.

Figure 5:
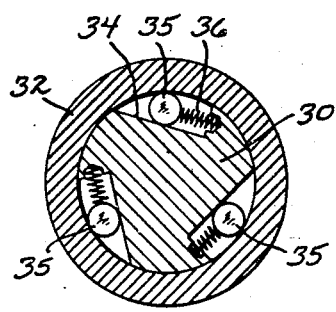
Fig. 5 is a detail of the clutch embodied in the mechanism.

An over-running clutch, functioning as hereinafter described, is partially carried by the sleeve 22. This clutch, as best shown in Fig. 5, comprises an inner portion 30 integral with the sleeve 22 and an outer portion 32 mounted for rotation with respect to the inner portion. To control the operation of the clutch three recesses 34 are provided, each carrying a roller 35 spring urged as at 36 into the wedge formed between the recess and the inner face of the outer clutch portion 32. The function of this clutch will be hereinafter described.

Figure 3:
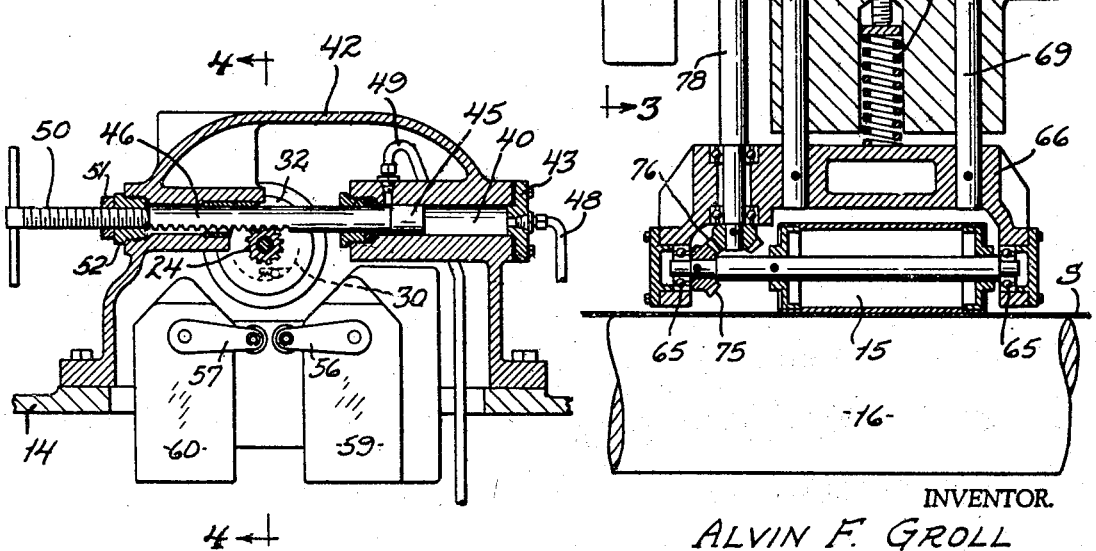
Fig. 3 is a section through Fig. 2 as indicated by the lines 3—3 thereon.
Figure 4:
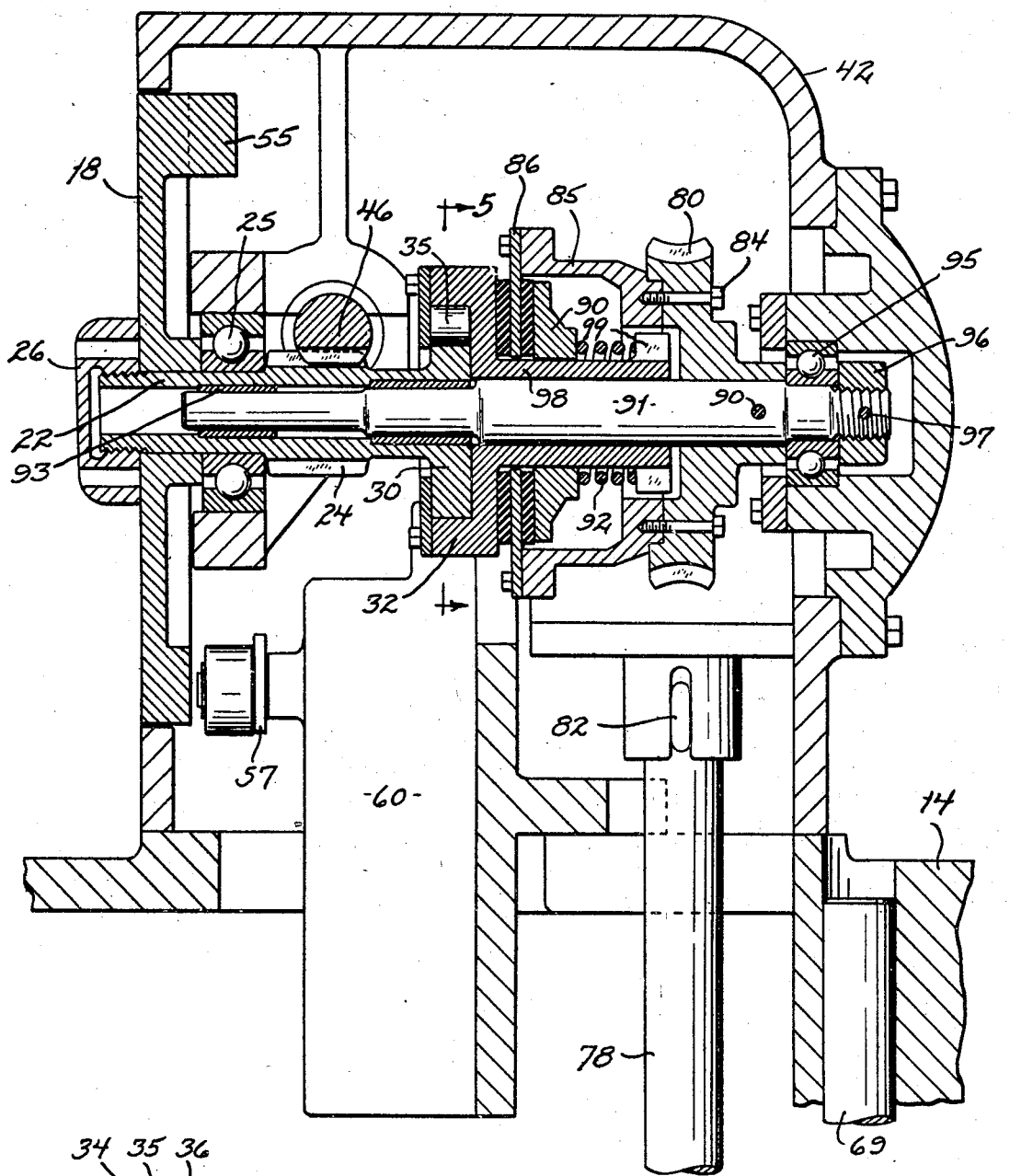
Fig. 4 is an enlarged section through Fig. 3 as indicated by the lines 4—4 thereon.

To rotate the indicator member a piston and cylinder arrangement, as shown in Fig. 3, is provided. This comprises a cylinder 40 formed in the case 42 of the indicating device. The cylinder is capped at 43 and slidingly receives a piston 45 operatively connected to a rack 46 in driving engagement with the pinion 24 on the indicator sleeve.

Fluid under pressure may be admitted to the cylinder 40 through connections 48 and 49 to shift the piston and, through the rack, rotate the indicator member. When the piston is moved from the left to the right (Fig. 3) the indicator travels through a measuring portion of this cycle end when the piston is moved from the right to the left (Fig. 3) the indicator member is accomplishing its return stroke.

To set the indicator for feeding sheets of varying lengths a screw member 50 is threadingly carried in the bushing 52 which is threaded in case 42 and locked in position by lock nut 51, and may be adjusted to control the length of travel of the rack 46. This in turn controls the amount of rotation of the indicator member.

As the indicator member is rotated from initial position a cam 55 formed thereon travels in a circular path to move contact arms 56 and 57 of limit switches 58 and 60 respectively as the member approaches zero position.

The actual rotation of the feeding rolls, such as 10 and 11, is effected electrically and is controlled through the position of the two limit switches just described. As the indicator moves clockwise it first strikes the arm 56, which acts through suitable electrical apparatus, not shown, to slow down the rate of travel of the sheet to be fed. As the cam engages the arm 57 this latter limit switch operates to stop the rotation of the feeding rolls.

It will thus be seen that the sheet feeding is stopped in two increments. First, it is slowed down from a high speed feed to a slow speed feed and finally it is stopped entirely, thus gradually removing the inertia from the moving sheet to prevent its being over fed.

The rate at which the integral member may be moved by the piston 48 is controlled through the sheet engaging roller 15 heretofore mentioned. This roller is carried in ball bearings 65 mounted in a sub-frame 66 and spring urged at 68 into engagement with a sheet S being fed. The sub-frame 66 is guided vertically by pins 69 slidingly received in the main frame 14. The spring may be adjusted by an adjusting screw 70 to control the pressure between the roll 15 and the sheet.

As the roll is driven by the sheet it operates through a pair of beveled gears 75 and 76 to drive a vertical shaft 78 carrying a worm, not shown, but in driving engagement with a worm wheel 80. A sliding connection in the shaft at 82 permits vertical adjustment of the roll while maintaining the drive. The gear wheel 80 is bolted at 84 to a clutch case 85 carrying a friction disk 86.

A sliding friction overload clutch is provided by engaging the disk 86 on opposite sides through the medium of a clutch plate 90, spring urged as at 92 against the said disk. Friction facing is interposed between the disk and the cooperating clutch faces to provide a continuous friction drive. The chief purpose of this friction clutch is to allow movement between the parts when the machine is reversed or when the feed length setting is varied. If the load transmitted to the shaft 78 becomes too great the clutch will slip and prevent damage to the parts.

The friction clutch and the worm wheel just described are mounted in axial alignment with the over-running clutch shown in Fig. 5. To this end the work wheel is keyed at 90 to a shaft 91, journalled at 93 inside of the hollow sleeve 22. At its other end the shaft is supported in ball bearings 95 and is maintained in position axially by a nut 96 and a pin 97, by which the same is locked to the shaft. The outer portion 32 of the over-running clutch is formed with a sleeve 98 idly carried on the shaft 91 and driven from the friction connection obtained through the disk 86 and the spring 92. A nut 99 is threadingly carried by the sleeve 98 and backs up the end of the spring 92 remote from the clutch plate 90.

As heretofore outlined, the indicator member is normally actuated by the admission of fluid under pressure to the cylinder 49. It becomes necessary, however, to synchronize such movement with the sheet travel in order that the length fed may be accurately controlled. The over-running clutch and the roll 15 and associated mechanism accomplish this function.

Assuming that sufficient pressure has been applied to the cylinder 49 to move the indicator member 18, it will be apparent that the over-running clutch acts as a lock to prevent rotation of the sleeve 22 and the member 19.

However, as a sheet is fed under the roll 15 the same operates through the mechanism above described to rotate the outer clutch ring 32. The effect of such rotation is to permit the rotation of the inner member 30 in the same direction and in the same amount. If the indicator member tends to move faster than the member 32 the locking rolls 35 (Fig. 5) prevent such motion. On the other hand, if the outer clutch ring 32 tends to over-run the inner member 30 the fluid pressure in the piston 48 will instantly revolve the sleeve 22 to maintain the same in synchronism with the member 32.

From the foregoing description it will be apparent that I have provided an improved indicating device by which the feeding of sheet stock may be accurately gauged and by which device stock of varying lengths may be fed.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a measuring device for sheet material, an indicator member adapted to move through a cycle and thereby control the length of sheet fed, means independent of the feeding of a sheet and comprising a piston and cylinder mounted for movement relative to each other by fluid pressure, a geared connection between said means and said indicator normally tending to move said indicator through its cycle, a rotatable member mounted to be engaged and driven by a sheet being fed and means controlled by rotation of said member to control the operation of said first-named means and geared connection.

2. In a measuring device for sheet material, an indicator member adapted to move through a cycle and thereby control the length of sheet fed, means to adjust the extent of travel of said indicator to feed sheets of differing lengths, means independent of the feeding of a sheet to drive said indicator, a roll member mounted to be engaged and driven by a sheet being fed, a driving connection between said roll member and said indicator member including an over-running clutch so mounted that the rate of rotation of said rotatable member controls the rate of travel of said indicator member by its actuating means.

3. In a measuring device for sheet material, an indicator member adapted to move through a cycle and thereby control the feeding of a sheet to means independent of the feeding of a sheet to drive said indicator comprising a rack and gear, means to drive said rack and rotate said gear to drive said indicator member, a roll member mounted to be engaged and driven by a sheet being fed, a driving connection between said roll member and said indicator member including an over-running clutch so mounted that the rate of rotation of said rotatable member controls the rate of travel of said indicator member by its actuating means.

4. In a measuring device for sheet material, an indicator member adapted to move through a cycle and thereby control the length of sheet fed, means to adjust the travel of said indicator to feed sheets of differing lengths, means independent of the feeding of a sheet to drive said indicator comprising a piston and cylinder mounted for movement relative to each other by fluid pressure, a rack and gear connection between said piston and said indicator member to drive the latter upon actuation of the former, a roll member mounted to be engaged and driven by a sheet being fed, a driving connection between said roll member and said indicator member including an over-running clutch so mounted that the rate of rotation of said rotatable member controls the rate of travel of said indicator member by its actuating means.

5. In a measuring device for sheet material, an indicator member adapted to move through a cycle and thereby control the length of sheet fed, means independent of the feeding of a sheet to drive said indicator comprising a piston and cylinder mounted for movement relative to each other by fluid pressure, a rack and gear connection between said piston and said indicator member to drive the latter upon actuation of the former, means to control the length of travel of said piston and the consequent amount of travel of said indicator to accommodate sheets of varying lengths, a roll member mounted to be engaged and driven by a sheet being fed, a driving connection between said roll member and said indicator member including an over-running clutch so mounted that the rate of rotation of said rotatable member controls the rate of travel of said indicator member by its actuating means and a slip clutch interposed between said indicator member and said rotatable member adapted for slippage under excessive load.

6. In a measuring device, a dial, mechanism for driving said dial comprising a rack and pinion, fluid actuate means for reciprocating said rack, a self-locking driving connection normally limiting the travel of said rack, and means to drive an element of said driving connection to thereby release said rack to permit the same to drive said dial.

7. In a measuring device, a dial, mechanism for driving said dial comprising a rack and pinion, fluid actuated means for reciprocating said rack, a self-locking driving connection comprising a worm and worm wheel normally limiting the travel of said rack, and means to drive said worm to thereby release said rack to permit the same to drive said dial.

ALVIN F. GROLL.